United States Patent [19]

Taylor

[11] Patent Number: 4,793,604
[45] Date of Patent: Dec. 27, 1988

[54] UNIVERSAL PRECISION POSITIONING JIG

[76] Inventor: Christopher L. Taylor, 3615 Courtdale Dr., Farmers Branch, Tex. 75234

[21] Appl. No.: 117,954
[22] Filed: Nov. 9, 1987
[51] Int. Cl.$^4$ ............................................. B23Q 3/00
[52] U.S. Cl. ................................................... 269/303
[58] Field of Search ............................. 269/303, 37–45

[56] References Cited

U.S. PATENT DOCUMENTS 3,124,180 3/1964 Cate .................................... 269/303

Primary Examiner—Gene Wan
Attorney, Agent, or Firm—Dennis T. Griggs

[57] ABSTRACT

A jig for maintaining a work piece in a predetermined position relative to a cutting tool is comprised of first and second relatively flat members having respective first and second major surfaces for being positioned in facing relationship. Each body member has a pair of parallel elongated racks of substantially equal lengths, with a plurality of teeth spaced at predetermined intervals along respective major axes of each rack. The racks on the first body member are positioned substantially in registration with the corresponding racks on the second body member so that the teeth of the facing racks are meshed together to inhibit the first and second body members from being moved relative to one another along the major axis of the jig. The position of the first body member relative to the second body member is adjustable along the major axis of the jig in predetermined increments corresponding to the width of the interval between successive teeth so that the effective length of the jig is adjusted accordingly. The flat end surface of each body member is adapted for attachment to a "fence" or other alignment tool used in woodworking operations.

12 Claims, 4 Drawing Sheets

UNIVERSAL PRECISION POSITIONING JIG

FIELD OF THE INVENTION

This invention relates generally to woodworking equipment, and in particular to apparatus for precisely orienting and maintaining a work piece in a predetermined position relative to a cutting tool.

BACKGROUND OF THE INVENTION

Operations in which wood and other material is shaped, drilled or cut by a power tool require the work piece to be precisely positioned relative to the power tool in order to achieve the desired results. For example, when a piece of wood is being cut by a table saw, the operator typically feeds the wood piece by hand through the saw blade along the axis of the desired cut to achieve as straight a cut as possible. This normally requires the aid of a "fence" or other alignment tool, which is oriented along the desired cut axis. The fence helps guide the wood piece through the saw blade when one edge of the wood piece is maintained in abutting relationship with the fence.

DESCRIPTION OF THE PRIOR ART

According to prior practice, the fence or other alignment tool is held in place by means of a clamping device. When it is desired to change the position of the wood relative to the cutting blade to make a different cut, the position of the fence or other alignment tool must be adjusted accordingly.

A major disadvantage of the prior art positioning and alignment devices is that they are usually not accurate enough when precise positioning (i.e., within a few thousandths of an inch) is required. Another disadvantage is that it is time-consuming and cumbersome to re-position the alignment devices to change the position of the work piece relative to the power tool, even if the desired degree of accuracy could be achieved.

OBJECTS OF THE INVENTION

It is, therefore, the principal object of the present invention to provide an improved device for positioning a work piece relative to a cutting tool.

Another object of the invention is to provide a device for precisely aligning and positioning a work piece relative to a cutting tool to an accuracy of within a few thousandths of an inch, or better.

Yet another object of the invention is to provide an improved positioning tool which can be returned to any former position to within less than one thousandth of an inch.

Still another object of the invention is to provide a device for positioning a work piece relative to a cutting tool, which can be quickly and accurately adjusted to change the relative position of the work piece.

A further object of the invention is to provide a device for precisely positioning a fence or other alignment tool which is used to align and position a work piece as the work piece is being operated on by a cutting tool.

SUMMARY OF THE INVENTION

These and other objects are accomplished in accordance with the present invention wherein a jig for maintaining a work piece is a predetermined position relative to a cutting tool is provided. The jig is comprised of first and second relatively flat body members having first and second major surfaces for being positioned in facing relationship and first and second rack means removably attached to the respective first and second major surfaces so that the first and second rack means are substantially in registration when the first and second major surfaces are in facing relationship. Each of the first and second rack means has a plurality of teeth equally spaced at predetermined intervals along the major axis thereof for being meshed together with the corresponding teeth of the other rack means to inhibit the body members from being moved relative to one another along the major axis of the jig. The jig further includes means for securing the first and second body members together along an axis which is substantially perpendicular with respect to the first and second major surfaces.

In one aspect of the invention the position of the first body member relative to the second body member is adjustable along the major axis of the jig in predetermined increments corresponding to spaced intervals between successive teeth of each rack means to adjust the effective length of the jig along its major axis. In one embodiment each of the first and second rack means is comprised of a pair of parallel elongated racks of substantially equal lengths.

In another aspect of the invention each of the first and second body members has a relatively flat end surface which is oriented substantially perpendicular with respect to the corresponding major surface of the body member for defining an alignment surface when the jig is used to maintain the work piece in a predetermined position. The respective flat end surfaces of the first and second body members are disposed at respective opposite ends of the jig when the respective first and second major surfaces of the first and second body members are in facing relationship. In one embodiment each of the flat end surfaces has a plurality of recessed regions for receiving an attachment member to attach a fence or other alignment tool to the corresponding flat end surface.

In the preferred embodiment each tooth has an alignment edge which extends longitudinally along the minor axis of the corresponding rack. The spaces between teeth in one rack receive the corresponding teeth of another rack when the racks are positioned in registration and the corresponding teeth thereof are meshed together.

The first and second body members have respective first and second elongated slots in the respective first and second major surfaces for receiving an elongated threaded bolt member therethrough. A threaded handle is provided for engaging complementary threads of the bolt members at one end thereof to secure the first and second body members together. Each of the first and second body members further includes a plurality of elongated openings therein for receiving respective mounting members to allow the jig to be mounted in a predetermined fixed position on a base surface. A distance measuring scale is provided to allow a user to read the actual distance which the first body member has been moved relative to the second body member along the major axis of the jig from a predetermined reference position at which the first and second body members are substantially completely in registration.

BRIEF DESCRIPTION OF THE DRAWINGS

Further objects and advantages of the invention will be apparent from the detailed description and claims when read in conjunction with the accompanying drawings wherein:

DETAILED DESCRIPTION OF THE PREFERRED EMBODIMENT

In the description which follows like parts are marked throughout the specification and drawings, respectively. The drawings are not necessarily to scale and in some instances proportions have been exaggerated in order to more clearly depict certain features of the invention.

Figure 1:
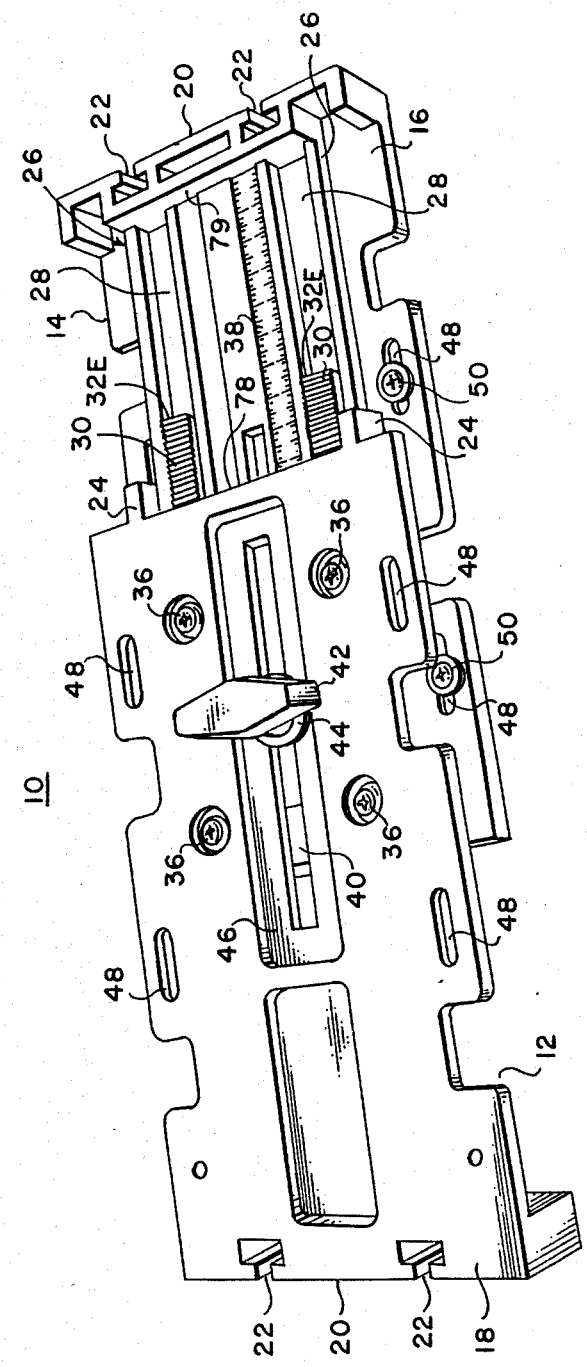
FIG. 1 is a perspective view of a positioning jig according to the present invention.

Referring to FIGS. 1–4, a jig 10 according to the present invention includes respective first and second body members 12 and 14, which are disposed at least partially in registration (as shown in FIG. 1) so that respective first major surfaces 16 of first and second body members 12 and 14 are in facing relationship and respective second major surfaces 18 of first and second body members 12 and 14 are oppositely positioned. First and second body members 12 and 14 each have a relatively flat end surface 20, which is oriented substantially perpendicular with respect to the planes of corresponding first and second major surfaces 16 and 18. Each end surface 20 has a pair of T-shaped recesses 22 for receiving an attachment member to secure a "fence" or other alignment tool in abutting relationship with the corresponding end surface 20, as will be described in greater detail with reference to FIGS. 5–7. Each body member further includes a pair of guide tabs 24 for engaging respective side surfaces 26 on the other body member for limiting transverse relative movement of the body members.

Figure 4:
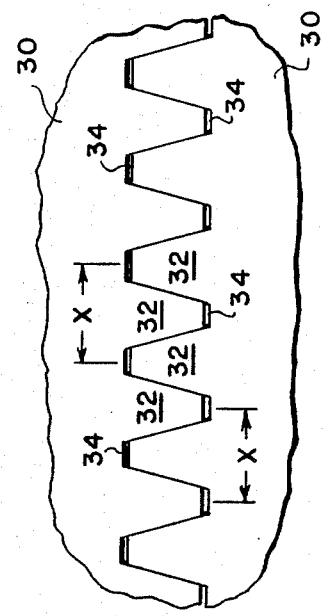
FIG. 4 illustrates the engagement of the rack teeth within the jig for securing the upper and lower body members together along a horizontal axis.
Figure 3:
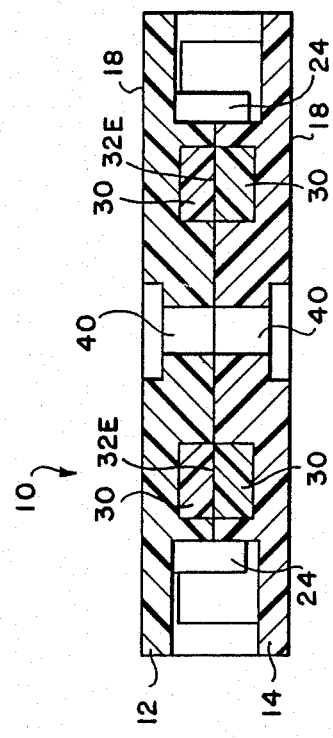
FIG. 3 is a sectional view of the jig shown in FIG. 1, taken along the line 3—3 in FIG. 2.
Figure 2:
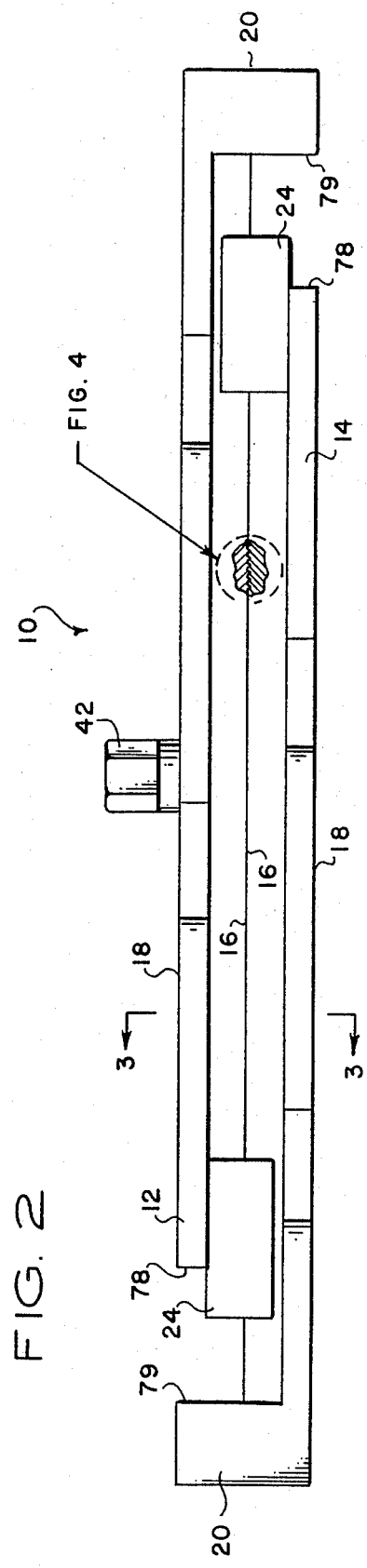
FIG. 2 is a side elevational view, with a portion thereof cut away, of the jig shown in FIG. 1.

First major surface 16 of each body member includes a pair of elongated channels 28 in which respective toothed racks 30 are disposed. As best seen in FIG. 4, each rack 30 includes a plurality of teeth 32 spaced apart at predetermined equal intervals "X" along the major axis of the corresponding rack 30, with a pocket 34 being defined between each adjacent pair of teeth. The teeth and pockets are intermeshed with the corresponding teeth and pockets of a facing rack 30 when respective first major surfaces 16 of first and second body members 12 and 14 are positioned in facing relationship. Each tooth 32 has an edge 32E extending laterally across the corresponding rack 30 (as best seen in FIG. 1) for engaging complementary pockets 34 on the facing rack 30. Preferably, each tooth 32 and each complementary pocket 34 has a substantially frustoconical crosssection taken along the major axis of the corresponding rack 30 to provide a "sawtooth" pattern. When complementary racks 30 are engaged as shown in FIGS. 2–4, first body member 12 is substantially inhibited from being moved along the major axis of the jig relative to second body member 14.

The interval "X" between successive teeth 32 is determined by the positioning step size desired for jig 10. For example, spacing interval "X" may be on the order of 1/32 inch so that the position of first body member 12 relative to second body member 14 may be adjusted in increments of 1/32 inch. One skilled in the art will recognize that the effective length of jig 10 may be adjusted accordingly in 1/32 increments by moving first body member 12 relative to second body member 14 along the major axis of jig 10.

The position of first body member 12 relative to second body member 14 is adjusted by lifting the first body member 12 upwardly to disengage the intermeshed teeth 32 and moving first body member 12 in either direction along the major axis of the jig to the desired position, whereupon the complementary racks 30 are re-engaged to "lock" first and second body members 12 and 14 together along the major axis of jig 10.

Racks 30 are removably attached to corresponding body members by means of attachment screws 36. Each rack 30 is attached using a pair of attachment screws 36. The heads of attachment screws 36 are received within respective recessed regions on the corresponding second major surfaces 18, as shown in FIG. 1. The opposite ends of attachment screws 36 are recessed beneath the toothed surfaces of the corresponding racks 30 so as not to interfere with the intermeshing of teeth 32 of racks 30.

A measuring scale 38 is provided for allowing the user to read the distance that first body member 12 has been moved relative to a second body member 14 with reference to a predetermined "zero" position. The zero position may be referenced to fully closed or fully open, and is typically the position at which first body member 12 is substantially completely in registration with second body member 14, i.e., when surface 78 of first body member 12 is in engagement with surface 79 on second body member 14 (fully closed). The length of scale 38 is typically equivalent to the maximum travel of first body member 12 relative to second body member 14 along the major axis of jig 10. Scale 38 is preferably "double-numbered" or "bi-directional" so that it can be conveniently read by the user with the "zero" position referenced to either the fully open or fully closed position.

First and second body members 12 and 14 include respective elongated slots 40, which are at least partially in registration for providing an opening in jig 10 along a vertical axis. A threaded carriage bolt (not shown) is inserted upwardly through slots 40 from beneath second body member 14 so that the head of the bolt engages second major surface 18 of second body member 14. A threaded handle 42 engages the opposite end of the bolt from the head thereof for tightening the bolt to secure first and second body members 12 and 14 together along both the vertical and horizontal axes when first body member 12 is at the desired position relative to second body member 14. A washer member 44 is interposed between handle member 42 and recessed surface 46 surrounding slot 40 on first body member 12 to distribute clamping pressure, and to prevent damage to first body member 12 by torquing of handle 42.

Each body member 12 and 14 further includes four elongated openings 48 for receiving respective mounting screws 50, as best shown in FIG. 1. Mounting screws 50 are used to anchor jig 10 in a fixed position on a relatively flat base surface. Thus, in the configuration shown in FIG. 1, second body member 14 is mounted in a fixed position on the base surface (not shown) by means of mounting screws 50 and first body member 12 is movable relative to the fixed second body member 14. One skilled in the art will recognize that first and second body members 12 and 14 are identical and can be readily interchanged as desired.

Figure 5:
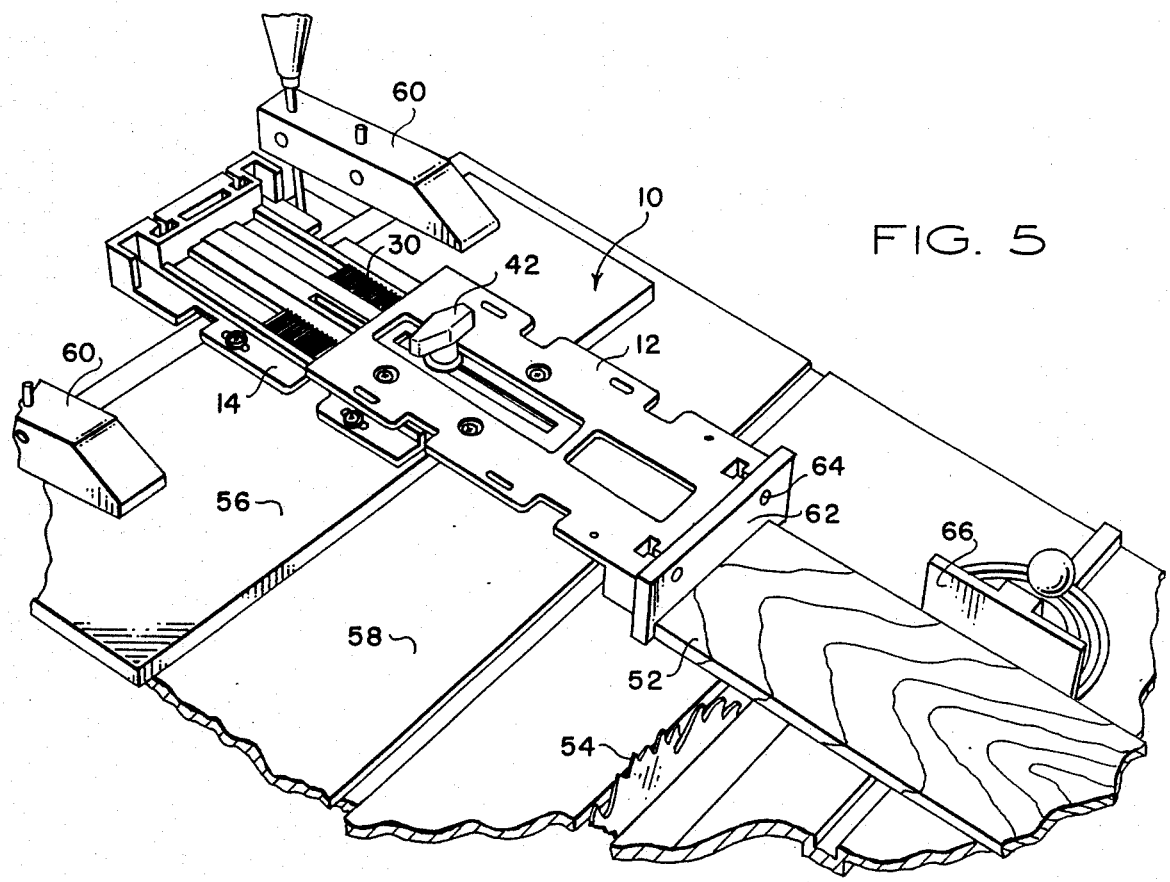
FIG. 5–8 are perspective views illustrating various applications of the jig in typical woodworking operations.
Figure 6:
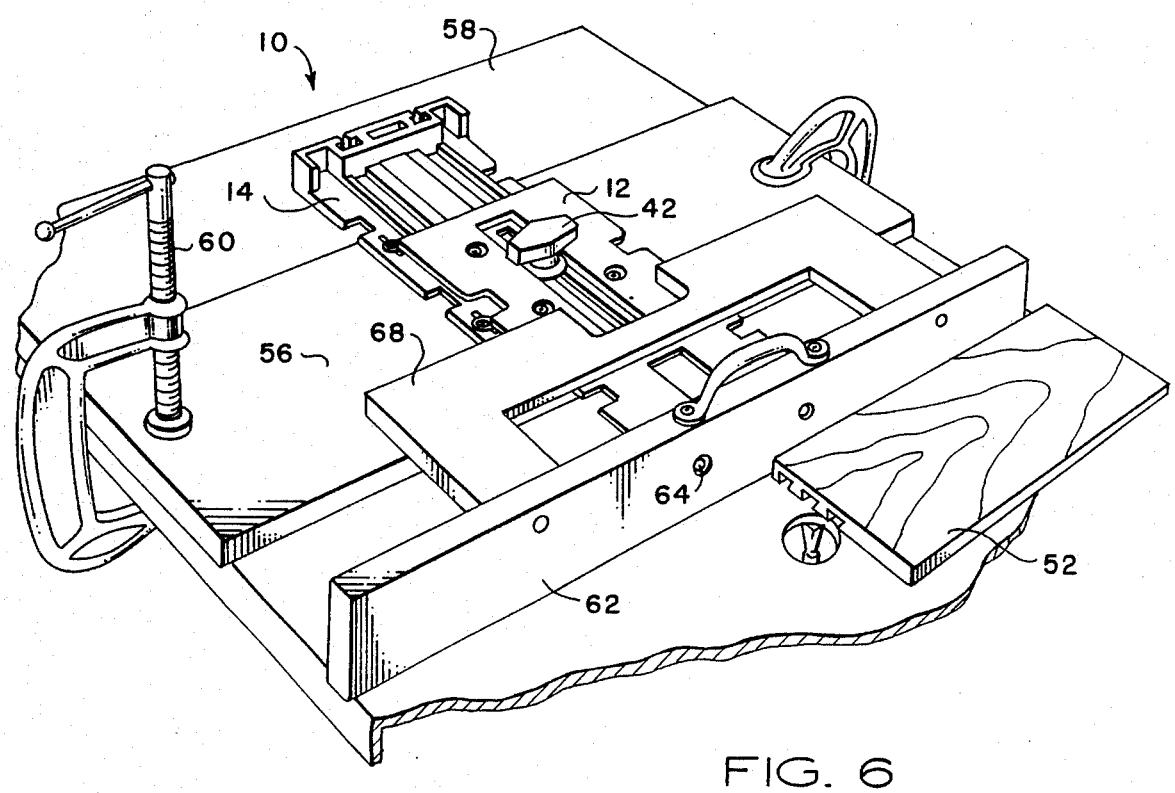
Figure 7:
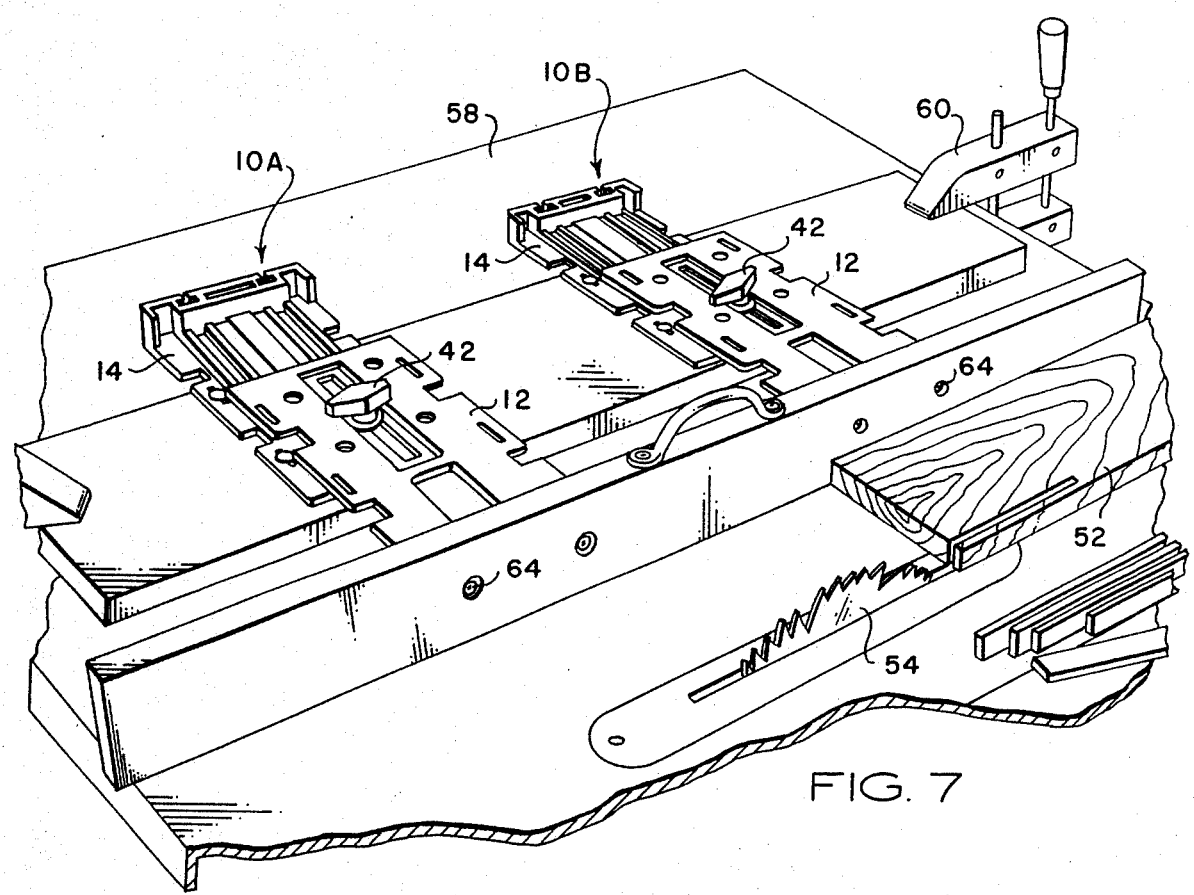

Referring to FIGS. 5-8, various applications of jig 10 are illustrated. In FIGS. 5 and 7, jig 10 is used to precisely position a wood piece 52 in a desired position relative to a table saw blade 54 and to maintain wood piece 52 in the desired position during the cutting operation. In FIG. 5, wood piece 52 is oriented to provide a transverse cut therein, while in FIG. 7, wood piece 52 is oriented to provide a longitudinal cut therein. In FIG. 5 a plywood base 56 is clamped to a work table 58 by clamping devices 60 and second body member 14 is secured to base 56 by mounting screws 50. A first "fence" 62 is secured in abutting relationship with end surface 20 of first body member 12 by attachment screws 64, which are received within T-shaped recesses 22. The edge of wood piece 52 at one end thereof is positioned in abutting relationship with first fence 62 and a side edge of wood piece 52 is positioned in contact with a miter gauge 66. The miter gauge 66 is movable by the user in a direction parallel to the desired cut axis to push wood piece 52 through cutting blade 54. First fence 62 locates wood piece 52 in the desired position at the start of the cutting operation. After the cutting operation is complete, additional cuts in wood piece 52 can be made by moving first fence 62 and wood piece 52 to achieve the desired cutting position.

In FIG. 7 an elongated first fence 62 (which may be on the order of 36 inches or more) is used to guide wood piece 52 when a longitudinal cut is to be made. In this configuration two jigs 10A and 10B are used to adjust the position of first fence 62 as desired. Jigs 10A and 10B are fixedly mounted to base 56, which is clamped to work table 58 by clamping devices 60.

FIG. 6 illustrates the use of jig 10 in connection with a router tool. Instead of using two jigs to anchor first fence 62, a square U-shaped brace 68 is used in conjunction with a single jig 10 to support first fence 62. A pair of central attachment screws 64 is used to mount first fence 62 on flat surface 20 of first body member 12. A threaded clamp 60 is used to hold base 56 in position on work table 58 and mounting screws 50 are used to anchor second body member 14 to base 56, as described above.

Figure 8:
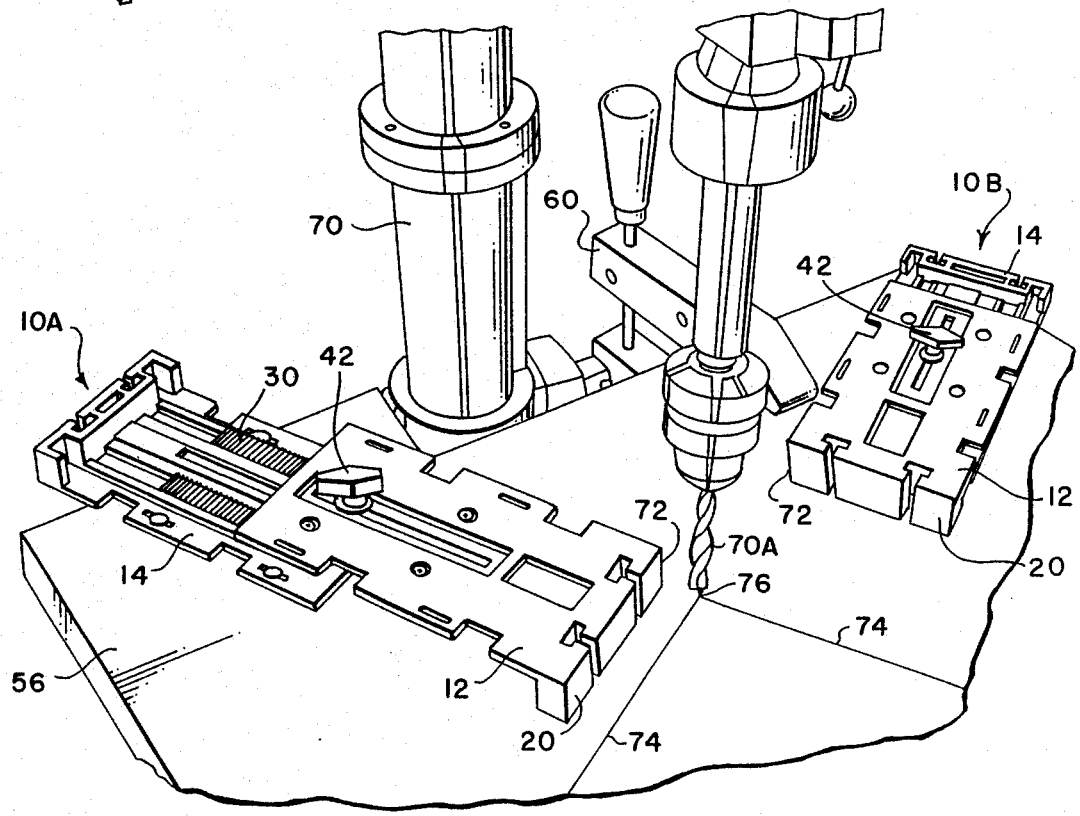

Referring to FIG. 8, a pair of jigs 10A and 10B is used to locate a desired drilling point along predetermined X-Y axes. Jigs 10A and 10B are rotated approximately 20 degrees relative to the X-Y axes of work table 58 in order to provide clearance for drill bit column 70. Jigs 10A and 10B are moved to their fully extended positions (i.e., first body member 12 is fully extended relative to second body member 14) and the two jigs are oriented so that respective edges 72 of flat end surfaces 20 meet at the center of table 48. A square, right triangle, or other suitable tool is used to orient respective flat end surfaces 20 of the two jigs perpendicular to one another. When jigs 10A and 10B are properly positioned, the respective second body members 14 thereof are secured to table 58 by means of mounting screws 50 as described above. A sharp knife is then used to mark two reference lines 74 in wood piece 52 along respective flat end surfaces 20 of the two jigs. Drill bit 70A is positioned directly above the intersection 76 of the two reference lines to drill a hole at the desired point.

One skilled in the art will appreciate that the jig position can be quickly and accurately adjusted by loosening handle 42 and moving first body member 12 relative to second body member 14 along the major axis of the jig. The position can be adjusted in increments as small as the width of each spacing "X" between successive teeth 32 for precise positioning within a few thousandths of an inch or better. First and second body members 12 and 14 and racks 30 are preferably comprised of a readily moldable material, such as a tough plastic material with substantial resistance to impact and shearing forces. The jig according to the present invention allows a user to precisely position a work piece relative to a cutting tool, such as a saw blade or a router bit and to maintain the work piece in the desired position during the cutting operation. The relative ease and accuracy with which the position of the jig members can be readjusted enhances the speed and accuracy of the cutting operations.

Various embodiments of the invention have now been described in detail. Since it is obvious that changes in and additions to the above-described preferred embodiment may be made without departing from the nature, spirit and scope of the invention, the invention is not to be limited to said details, except as set forth in the appended claims.

What is claimed is:

1. A jig for orienting and/or maintaining a work piece in a predetermined position relative to a cutting tool, said jig comprising:
   first and second relatively flat body members having first and second major surfaces for being positioned in facing relationship;
   first and second rack means coupled to the respective first and second major surfaces so that first and second rack means are substantially in registration when said first and second major surfaces are in facing relationship, each of said first and second rack means having a plurality of teeth spaced at predetermined intervals along a major axis of the corresponding rack means for being meshed together with corresponding teeth of complementary rack means to inhibit said body members from being moved relative to one another along the major axis of the jig; and
   means for securing said body members together along an axis which is substantially perpendicular with respect to the first and second major surfaces.

2. The jig according to claim 1 wherein the position of the first body member relative to the second body member is adjustable along the major axis of the jig in predetermined increments corresponding to the width of the interval between successive teeth on each rack means to adjust the effective length of the jig along the major axis thereof.

3. The jig according to claim 2 wherein each of said first and second rack means is comprised of a pair of parallel elongated racks of substantially equal lengths, each of the racks on the first body member for engaging a corresponding rack on the second body member when the first and second major surfaces are positioned in facing relationship.

4. The jig according to claim 2 wherein each of said body members has a relatively flat end surface which is oriented substantially perpendicular with respect to the major surfaces of the corresponding body member for defining an alignment surface when said jig is used to maintain said work piece in said predetermined position.

5. The jig according to claim 4 wherein the respective flat end surfaces of the first and second body members are disposed at respective opposite ends of said jig when the respective first and second major surfaces are in facing relationship.

6. The jig according to claim 5 wherein each of said flat end surfaces has a plurality of recessed regions for receiving an attachment member to secure a fence or other alignment tool to the corresponding flat end surface.

7. The jig according to claim 2 wherein the first and second body members have respective first and second elongated slots for being positioned at least partially in registration to receive said securing means therethrough.

8. The jig according to claim 7 wherein said securing means is comprised of an elongated threaded bolt member for penetrating through said first and second slots or any other clamping mechanism and threaded means for engaging complementary threads on said bolt member to tighten said bolt member in a predetermined fixed position to prevent said body members from being moved relative to one another along the major axis of the jig and along said axis which is substantially perpendicular to the first and second major surfaces.

9. The jig according to claim 2 wherein each of the body members further includes a plurality of elongated openings therein for receiving respective mounting members to allow said jig to be mounted in a predetermined fixed position on a base surface.

10. The jig according to claim 2 wherein each of said body members further includes a distance measuring scale to allow a user to read the actual distance which the first body member has been moved relative to the second body member along the major axis of the jig from a predetermined reference position at which the first and second body members are substantially completely in registration.

11. The jig according to claim 2 wherein each of said teeth extends substantially completely across the corresponding rack means.

12. The jig according to claim 11 wherein each of said teeth has a substantially frusto-conical or any other suitable cross-section taken along the major axis of the corresponding rack means and each interval between successive teeth is comprised of a complementary frusto-conical or other suitable recess for receiving the corresponding teeth of complementary rack means.

* * * * *